Jan. 16, 1962  D. W. ROBINSON, JR., ET AL  3,017,147
AERIAL DEVICE HAVING ROTOR FOR RETARDING DESCENT
Filed Nov. 4, 1959  3 Sheets-Sheet 3

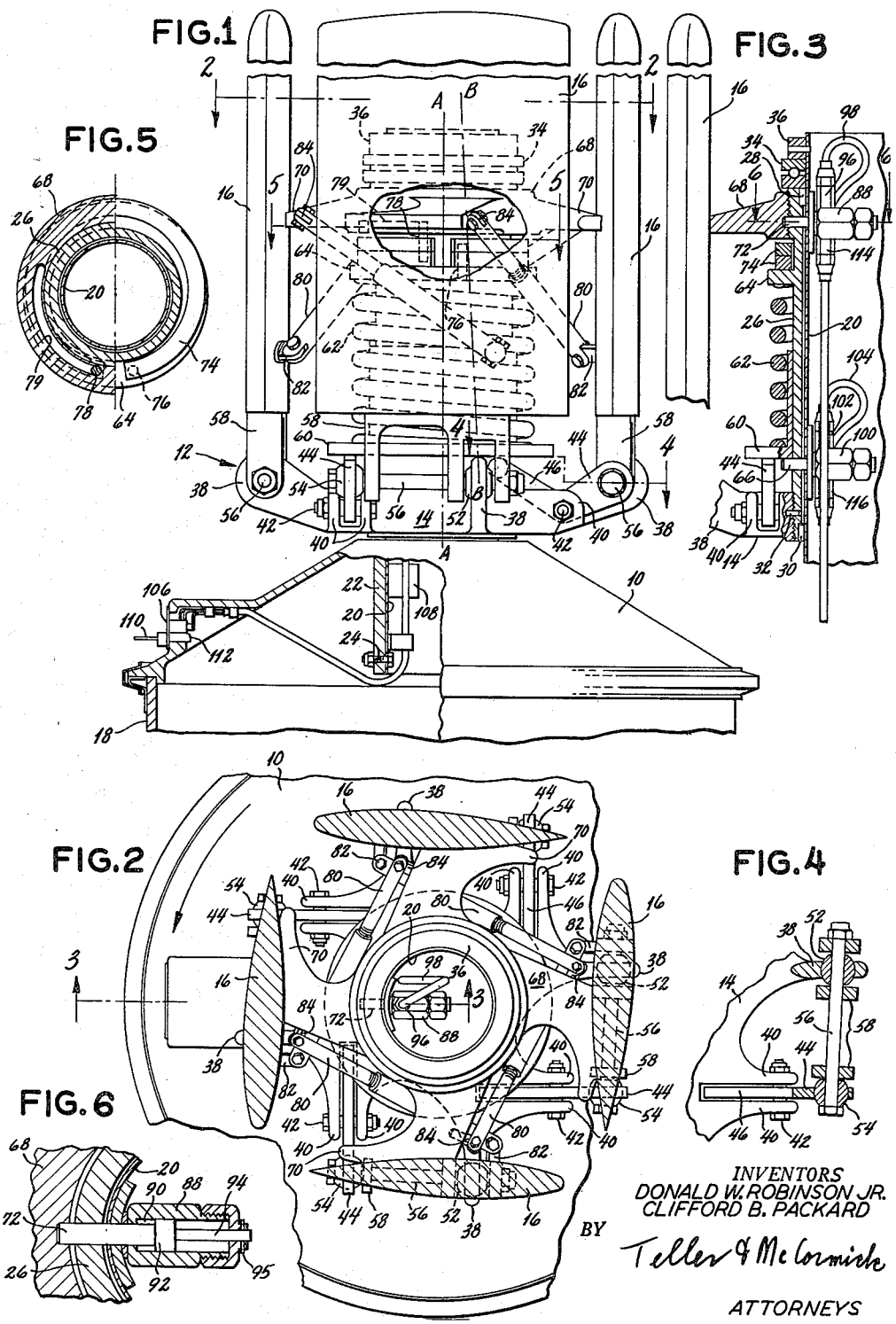

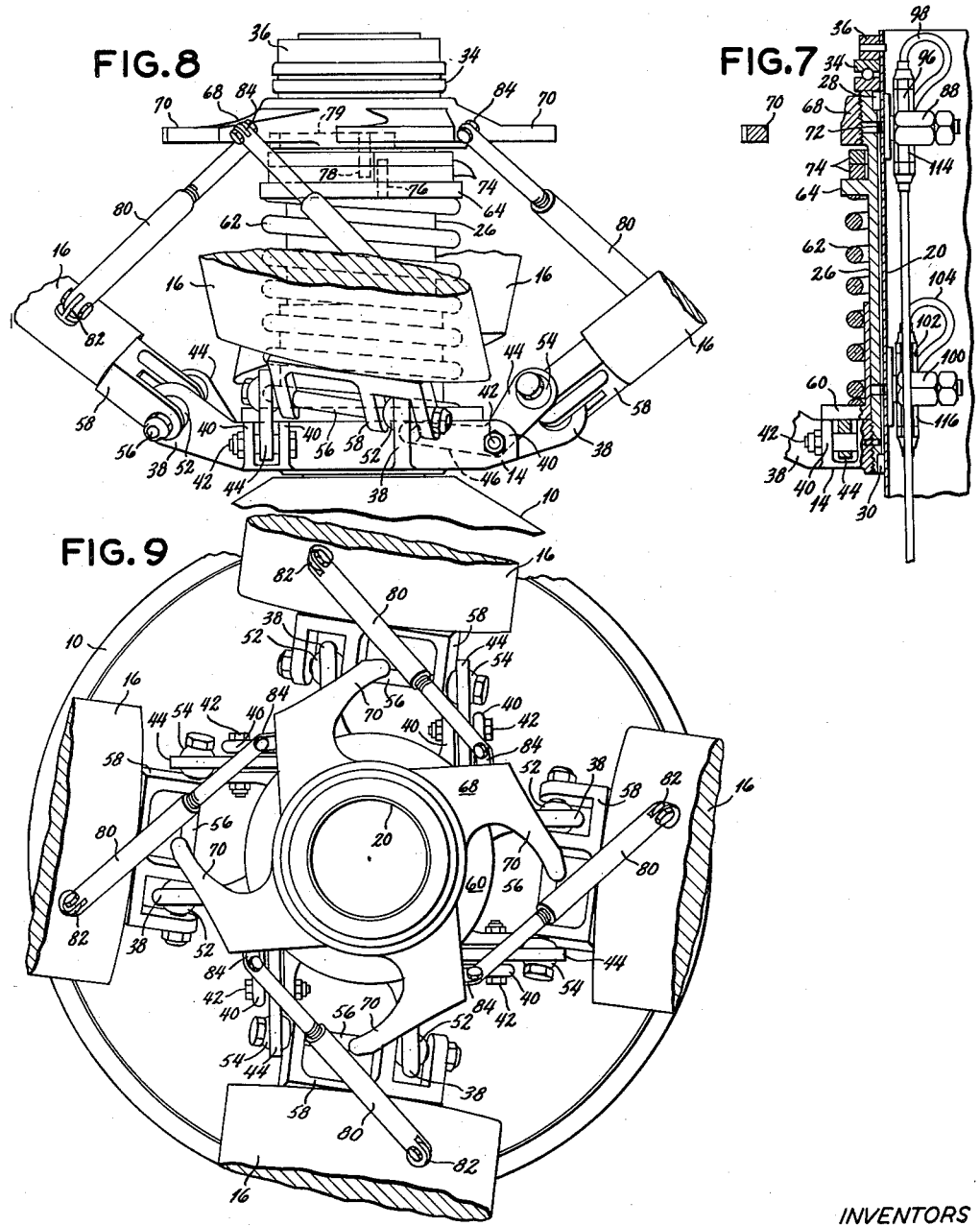

INVENTORS
DONALD W. ROBINSON JR.
CLIFFORD B. PACKARD
BY Teller & McCormick
ATTORNEYS

United States Patent Office 3,017,147
Patented Jan. 16, 1962

3,017,147
AERIAL DEVICE HAVING ROTOR FOR
RETARDING DESCENT
Donald W. Robinson, Jr., Hazardville, and Clifford B.
Packard, Glastonbury, Conn., assignors to The Kaman
Aircraft Corporation, Bloomfield, Conn., a corporation
of Connecticut
Filed Nov. 4, 1959, Ser. No. 850,830
14 Claims. (Cl. 244—138)

The invention relates to an aerial device having a rotor for retarding descent, said device being in many respects similar to that disclosed in the Wannlund and Rhodes application Serial No. 504,166, filed April 27, 1955, now Patent No. 2,978,211, and entitled "Aerial Device Having Rotor for Retarding Descent," and said device being in many respects also similar to that disclosed in the Polleys, Payton and Robinson application Serial No. 721,605, filed March 14, 1958, and entitled "Aerial Device Having Rotor for Retarding Descent."

A device embodying the invention may be called a rotary blade parachute and it is adapted for the controlled safe delivery to the ground of supplies or equipment or an article or mechanism from an aircraft or otherwise from an elevated position. The device may be carried on an aircraft and released therefrom and said device may be connected to a container or body constituting or adapted to carry a useful load, but in these respects the invention is not necessarily limited. A device embodying the invention is adapted for use at various speeds including those in the supersonic range and it may be released at either a high altitude or a low altitude after which it descends in a stable attitude.

One object of the invention is to provide a device of the type set forth having releasable latching means for initially preventing the operation of certain mechanisms.

Another object of the invention is to provide means automatically effective immediately upon the release of the device and serving to positively move the blades from initially parallel positions to outwardly inclined or coning positions.

Another object of the invention is to provide a device of the type set forth in said prior applications wherein there is means for providing two stages of speed control for the rotor, there being an initial high speed stage and a subsequent lower speed stage.

Other objects of the invention will be apparent from the drawings and from the following description and claims.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1. is a fragmentary side view of a rotary blade device embodying the invention, this view showing the device in its vertical attitude.

FIG. 2 is a combined plan and horizontal sectional view of the device as shown in FIG. 1, the sectional portion of the view being taken along the line 2—2 of FIG. 1.

FIG. 3 is a fragmentary vertical sectional view taken along the line 3—3 of FIG. 2.

FIG. 4 is a fragmentary horizontal sectional view taken along the line 4—4 of FIG. 1.

FIG. 5 is a fragmentary horizontal sectional view taken along the line 5—5 of FIG. 1.

FIG. 6 is an enlarged fragmentary horizontal sectional view taken along the line 6—6 of FIG. 3.

FIG. 7 is a fragmentary vertical sectional view generally similar to FIG. 3, but showing the various parts in different relative positions.

FIG. 8 is a fragmentary side view generally similar to FIG. 1, but showing the various parts in different relative positions, these being the same positions that are shown in FIG. 7.

FIG. 9 is a combined plan and sectional view generally similar to FIG. 2, but showing the parts in the same relative positions as in FIGS. 7 and 8.

Figure 10:
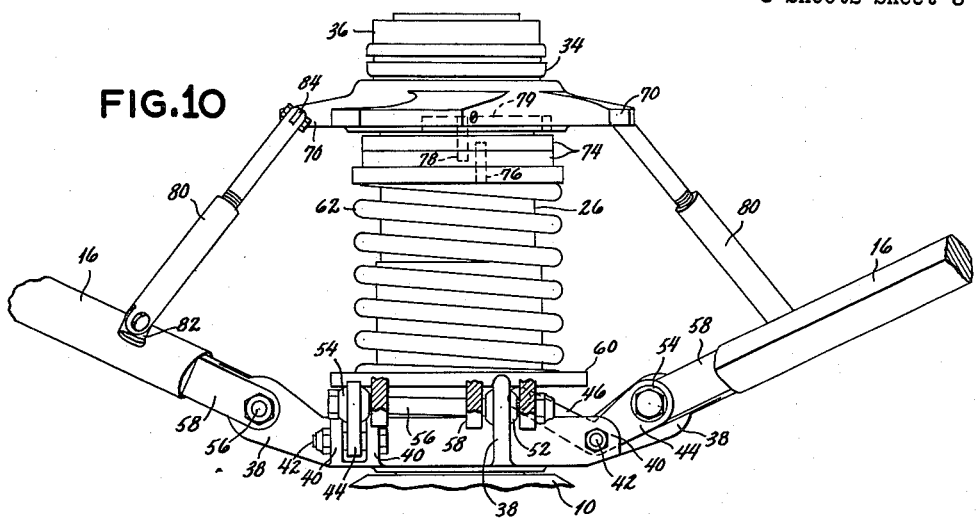
FIG. 10 is a fragmentary view similar to FIG. 8, but showing the various parts in different relative positions, only two blades being shown for simplicity of illustration.

*General description of device and manner of operation*

A device embodying the invention is adapted to be carried by an aircraft and it is ordinarily so carried in a generally horizontal position or attitude. The device may be carried on the aircraft and released therefrom in the manner disclosed in the said Polleys, Payton and Robinson application, more particularly in FIGS. 1, 2 and 3 thereof.

For convenience of illustration the drawings show the device in its vertical or upright attitude. However, it should be understood that the device does not ordinarily reach the upright attitude until after an appreciable time following release, some of the hereinafter described action taking place while the device is shifting from its initial horizontal attitude to its subsequent vertical or upright attitude. For clarity, some of the parts will sometimes be stated to be horizontal or vertical, reference being had to the position or attitude as shown in FIG. 1, and it will be understood that such terms are used in a relative sense only and are not intended to limit the scope of the invention.

A device embodying the invention comprises a body 10 and also comprises a rotor 12 which is connected with the body and serves as an aerodynamic retarding or braking mechanism for restricting downward movement of the body. The rotor 12 comprises a hub 14 and blades 16, 16. The rotor is shown as having four blades, but it will be understood that a device embodying the invention may have a different number of blades. As shown, the rotor 12 is connected with the body 10 for rotation about an axis in fixed relation to said body, but the invention is not necessarily limited to a fixed relationship between said axis and said body. As illustrated, the body 10 is a cover or adapter to which a load container 18 is releasably connected. The details of the cover or adapter 10 and of the container 18 do not constitute parts of the present invention and a detailed description is unnecessary.

*More specific description of device*

As shown in FIG. 1, a vertical tube or hollow cylinder 20 is provided which constitutes a pintle and at its lower end is fixedly connected to the body or adapter 10 or is adapted to be so connected. The adapter has an integral tubular portion 22, and the cylinder 20 fits within said portion and extends upwardly therefrom. The pintle or cylinder is held in place by bolts 24, 24. The before-mentioned rotor hub 14 is an annulus surrounding the cylinder 20 and rotatable relatively thereto. As shown, the hub 14 is fixedly secured to a relatively rotatable sleeve 26 that surrounds the cylinder 20. Bearings 28 and 30 are interposed between the sleeve 26 and the cylinder 20, which bearings control the relative rotation of the sleeve and the rotor. The hub 14 is shown as having threaded engagement with the sleeve 26 and a pin 32 is provided for preventing relative rotation of the hub on the threads. A releasable latching device is preferably provided for initially preventing rotation of the rotor and sleeve relatively to the pintle or cylinder 20. This device will be hereinafter more fully explained.

An antifriction thrust bearing 34 is interposed between the upper end of the sleeve 26 and a ring 36 secured to the cylinder 20 near the upper end thereof. As before stated, the action of the rotor retards or controls downward movement of the body, and the weight of the body is transmitted to the rotor by means of said pintle or cylinder 20 and said bearing 34 and said sleeve 26 to which the rotor hub 14 is fixedly connected.

The four blades 16, 16 are similarly connected to the hub 14 for pivotal movements about transverse sweep axes tangent to a cylinder concentric with the central axis. The several connecting means for the blades are so constructed and arranged that the sweep axes may be tilted with respect to the hub. Said sweep axes may be tilted relatively to a horizontal plane for changing the pitches of the blades and they may also be tilted in directions parallel with said plane for a purpose to be stated.

The presently preferred connecting means for one blade will now be described. Referring more particularly to FIGS. 1 and 4, the hub 14 is provided, for each blade, with an integral blade connecting flange 38 and with two companion integral blade connecting flanges 40, 40. The flange 38 is at one side of a vertical plane through the central axis and through the center of the blade 16 that is to be connected, and the flanges 40, 40 are at the other side of said plane. Mounted on the flanges 40, 40 and between them for movement about a horizontal axis at 42 is a lever 44 having an inwardly extending arm 46. Carried in openings in the outer end of the flange 38 and in the outer end of the lever 44 are fitted balls 52 and 54, said balls being apertured to receive and fit a pivot pin 56. Each blade 16 at its inboard or lower end has a blade support 58 fixedly connected thereto which blade support is apertured to receive and fit the pivot pin 56. As best shown in FIG. 1, the blade support 58 is notched to receive the flange 38 and the corresponding ball 54.

The axis of each pin 56 constitutes the before-mentioned transverse sweep axes for the corresponding blade. The flange 38 and the lever 44 and the balls 52 and 54 for each blade carry the corresponding pin 56 and constitute a pair of blade supports, one of which is pivotally movable outwardly and downwardly or inwardly and upwardly. As hereinafter more fully explained, the movement of one of the balls for each blade relatively to the other ball for said blade will change the blade pitch. The ball 54 is carried by the movable lever 46 and it is therefore the ball 54 that is moved to change the blade pitch. Inasmuch as the rotor rotates counterclockwise, each ball 52 supports the corresponding blade near its leading edge and the relatively movable ball 54 supports the blade near its trailing edge. The leading ball 52 provides a pivot point about which the corresponding pin 56 is movable when the ball or support 54 is moved.

A ring 60 is vertically movable along the sleeve 26, suitable key or other means, not shown, being provided to prevent rotation of the ring relatively to the sleeve. The inner arm 46 of each lever 44 abuts against the lower face of the ring 60. A heavy coil spring 62 surrounds the sleeve 26 and abuts at its upper end against a collar 64 on said sleeve. The spring 62 abuts at its lower end against said ring 60 and biases the ring downwardly. Initially, the ring 60 engages a radially movable retaining pin 66 which limits downward movement of the ring 60 at the position shown in FIGS. 1 and 3. The pin 66 also initially prevents rotation of the sleeve 26 and of the rotor relatively to the cylinder 20 and it constitutes the before-mentioned latching device.

As long as the ring 60 is held by the pin 66, the levers 44, 44 and the pivot pins 56, 56 and the blades 16, 16 are in the relative positions shown in FIGS. 1 and 2. With the parts in said relative positions, the axis of each pivot pin 56 is approximately horizontal and is approximately perpendicular to the flanges 38 and 40, 40. When the several parts are in the last said positions, the center lines A—A of the blades 16, 16 extend upwardly from said pivot pins 56, 56, said blades being at least approximately parallel with each other. The initial included coning angle between the blades is relatively small and as shown it is so small as to be practically nonexistent. Said center lines A—A of the blades are at least approximately in axial planes through the axis of rotation. The described positions shown in FIGS. 1 and 2 are sometimes hereinafter referred to as "first positions."

A relatively rotatable synchronizer or equalizer plate 68 surrounds the sleeve 26 near the upper end thereof and above the collar 64. The plate 68 has integral arms 70, 70 which are shaped to fit the blades 16, 16. When the plate is in its initial position as shown in FIGS. 1, 2, and 3, it serves as an abutment to limit inward movements of the blades, the blades being thus held against inward movements beyond their previously mentioned parallel positions. As shown, the relatively rotatable synchronizer plate 68 has threaded connection with the sleeve 26 and it is rotatable on the threads. A radially movable retaining pin 72 extends through a hole in the sleeve and into a hole in the plate 68 to initially prevent relative rotation. The pin 72 cooperates with the pin 66 to initially prevent rotation of the sleeve 26 and of the rotor relatively to the cylinder 20.

Means is provided for rotatively moving the synchronizer plate 68 relatively to the sleeve 26 upon the withdrawal of the retaining pin 72, the plate being preferably rotated in the counterclockwise direction. As shown, the last said means comprises a split ring 74 which surrounds the sleeve 26 immediately above the collar 64. Two similar spring rings 74, 74 are shown, but this is not essential. At one end the rings 74, 74 are apertured to receive a pin 76 carried by the collar 64 and extending upwardly therefrom, and at the other end the rings 74, 74 are apertured to receive and hold a pin 78 which projects upwardly into a groove 79 in the plate 68. The groove 79 is best shown in FIG. 1. When the several parts are in the relative positions shown in FIGS. 1, 2 and 3, the spring ring 74 is under tension and it tends to move the pins 76 and 78 toward each other. The pin 78 engages the relatively rotatable plate 68 and therefore upon withdrawal of the retaining pin 72, the spring 74 moves the pin 78 toward the right as viewed in FIGS. 1 and 5. Thus the plate 68 is moved in the counterclockwise direction. The groove 79 extends circularly toward the left and it provides clearance for the pin 79 so that the pin does not interfere with additional counterclockwise movement of the plate 68 relatively to the collar 64.

Means is provided for uniformly moving the several blades about their sweep axes at 56, 56 so as to provide proper coning angles, and the same means serves to insure uniformity of coning angles under various conditions as hereinafter more fully explained. The last-mentioned means includes the before-mentioned relatively rotatable equalizer plate 68. The before-mentioned arms 70, 70 on the plate 68 engage the respective blades, and when the plate is rotated the arms act to move the blades 16, 16 outwardly about their sweep axes. The said means for moving the blades about their sweep axes also includes links 80, 80 which respectively connect the blades with said synchonizer plate. The links 80, 80 at their outer or lower ends have universal connections 82, 82 with the blades, and at their inner or upper ends have universal connections 84, 84 with the arms 70, 70 on the ring. Preferably, each link 80 has two parts having threaded connection with each other so that the link may be adjusted as to length and thus provide uniformity of the initial blade movements. Any necessary adjustment is made during assembly, and the links have constant lengths during the functioning of the device. The mechanism comprising said plate 68 and the arms 70, 70 thereof together with said links 80, 80 constitutes a coning means which serves to move the blades downwardly and outwardly as hereinafter described. The last said mechanism serves to prevent any blade from moving to a coning angle different from that of any other blade.

Figure 11:
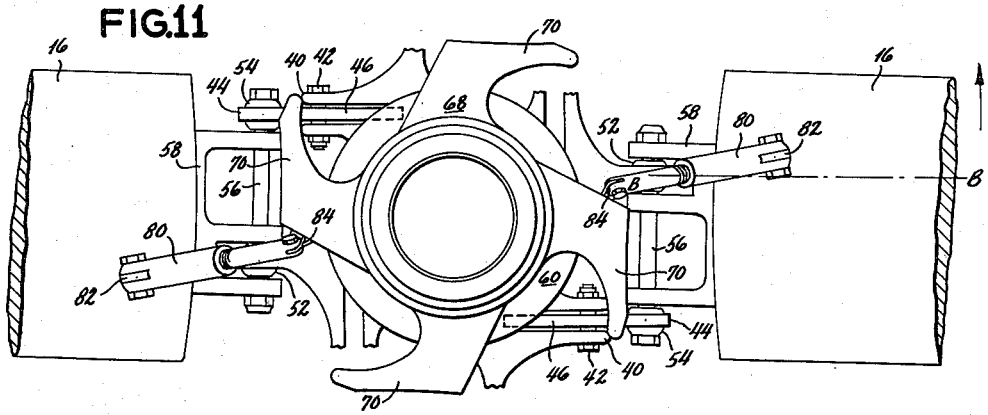
FIG. 11 is a combined plan and sectional view generally similar to FIG. 9, but showing the parts in the same positions that are shown in FIG. 10.

As shown, the pivotal axis of the connection 82 of each link 80 with the corresponding blade 16 is substantially spaced in the leading direction from a line B—B, shown in FIG. 11, which line extends through the center of gravity, not shown, of the blade and through the pivot center of the leading ball joint at 52. The reason for this spacing will be fully explained hereinafter.

Means are provided for simultaneously releasing the latching means which includes the two retaining pins 66 and 72 when the device is released from the aircraft upon which it has been carried. While the invention in its broader aspects is not so limited, it is preferred to withdraw the pins by devices responsive to the action of explosive charges, preferably cartridges. The two retaining pins 66 and 72 collectively constitute the before-mentioned latching device for preventing relative rotation of the sleeve and rotor, and said explosive charge devices constitute means for moving the latching means to disengage it from the rotor so as to permit relative rotor rotation.

The two explosive charge devices are similar and it will be sufficient to describe that for the upper pin 72. Secured to the inner wall of the cylinder 20 is hollow member 88 having a piston chamber 90 therein as shown in FIG. 6. The inner end of the member 88 is closed by a cap 91. The pin 72 extends into the chamber 90 and is provided with a piston 92 that fits the chamber. An extension 94 of the pin extends through a hole in the cap 91 and is held in position by a shear element 95. Connected with the member 88 near the outer end thereof is a member 96 adapted to enclose an explosive cartridge and having an aperture, not shown, communicating with the piston chamber 90. Electric wires in a cable 98 serve upon the closing of a circuit to ignite the cartridge in the member 96 so that the gases of explosion enter the piston chamber 90. As the result of gas pressure, the piston 92 is moved inwardly or toward the right as shown in FIG. 6. This movement shears the shear element 95 and it withdraws the pin 72 to permit rotative movement of the synchronizer plate 68 by the spring 74 and to free the sleeve 26 for separate rotation.

For withdrawing the lower retaining pin 66 there is provided a similar device having a hollow member 100 similar to the member 88 and having a cartridge member 102 similar to the member 96. Electric wires in a cable 104 serve to ignite the cartridge in the member 102, thus withdrawing the pin 66 to permit the ring 60 to be moved downwardly by the spring 62 and to free the sleeve 26 for separate rotation.

The wires in the cables 98 and 104 are connected with an initially open switch 106 carried by the body 10 and connected in circuit with a battery 108 on said body. The switch 106 is biased to its closed position, but is initially held open by a static block 112 connected with a static cord 110. When the device is released from the aircraft which has carried it, the static cord 110 withdraws the block 112 so as to permit the switch 106 to close. Upon closing of the switch, circuits are completed to fire the cartridges in the members 96 and 102, thus withdrawing the pins 66 and 72.

In order to provide for the possible failure of a cartridge, the member 96 and 102 may be duplicated as shown and the necessary additional electrical connections may be provided, the duplicate members being shown at 114 and 116. Thus, if one cartridge for either retaining pin should fail to fire, it is probable that the other cartridge would fire to effect the necessary pin withdrawal.

*Manner of operation*

When the device is released from an aircraft, said device continues in forward motion at high speed, the direction of forward motion being ordinarily axial and gradually shifting from horizontal to vertical.

Upon such release, the static block 110 is withdrawn by the cord 112 and the switch 106 is closed to fire or ignite the cartridges with resultant withdrawal of the retaining pins 66 and 72, that is, with resultant release of the latching devices. FIG. 7 is generally similar to FIG. 3, but it shows the retaining pins withdrawn and shows other parts in different positions. With the pins withdrawn, the sleeve and the rotor are free to rotate relatively to the cylinder 20.

As a further result of the withdrawal of the lower pin 66, the ring 60 is permitted to be moved downwardly by the spring 62 to the extent permitted by the hub 14. As the ring moves downwardly, the inner arms 46, 46 of the several levers 44, 44 are moved downwardly, and by the movement of the levers the several balls 54, 54 are swung upwardly and also inwardly. The balls 52, 52 on the relatively fixed supports 38, 38 are not bodily moved and the result is that the trailing ends of the sweep axes at 56, 56 are swung upwardly and inwardly to substantially tilt the said axes. Referring particularly to FIG. 1, it will be apparent that upward movement of the ball 54 for each blade results in the upward tilting of the axis at 56 and causes the center line of the blade to tilt toward the right in the leading direction.

As a further result of the withdrawal of the upper pin 72, the synchronizer plate 68 is permitted to be moved rotatively in the counterclockwise direction by the springs 74. As soon as movement of the plate 68 starts, the arms 70, 70 thereof press against the blades 16, 16 to immediately start outward swinging movements thereof to coning angles. The links 80, 80 cooperate with the arms 70, 70 for moving the blades outwardly and downwardly. Initial blade movements are started quickly and positively by said arms 70, 70 and by said links 80, 80. The described outward movements of the blades take place simultaneously with the described tilting movements in the leading direction.

When the retaining pins 66 and 72 are withdrawn, the ring 60 and the plate 68 are moved simultaneously and very quickly by their respective springs 62 and 74. By the action of the ring 60 and the levers 44, 44 combined with the action of the plate 68 and the links 80, 80, the several blades are moved very quickly to the positions shown in FIGS. 7, 8 and 9. The last said positions of the blades are sometimes hereinafter referred to as "second positions." The rapid forward motion of the device continues, but the blades are moved to said second positions before they have caused any substantial rotation of the rotor and therefore before the application to the parts of any substantially centrifugal forces.

Referring particularly to FIG. 7, it will be seen that the ring 60 has been moved downwardly to the maximum extent permitted by the hub 14. The inner arms 46, 46 of the levers 44, 44 have therefore been moved downwardly to their maximum extent and the corresponding balls 54, 54 have been moved upwardly and inwardly to their maximum extent, the positions of the several parts being shown in FIGS. 8 and 9. The described movements of the balls 54, 54 cause the blades 16, 16 to assume large negative pitch angles. The continued high forward speed of the device and the large negative pitch angles taken with the substantial coning angles cause rotation of the rotor at rapidly increasing speeds. However, as the rotative speeds increase, the centrifugal forces acting on the blades 16, 16 tend to increase the included coning angles and also tend to move the balls 54, 54 outwardly.

The outward forces applied to the balls 54, 54 turn the levers 44, 44 in the directions to move said balls not only outwardly but also downwardly, the inner lever arms 46, 46 being moved upwardly in opposition to the spring 62. The downward components of the last said bodily movements of the balls 54, 54 serve to move the trailing edges of the blades relatively downwardly with a resulting decrease in the initially large negative pitch angles of the blades. The last said downward movements of the balls 54, 54 and upward movements of the arms 46, 46 are opposed by the spring 62 and a condition of equilibrium may be reached with the centrifugal action on the balls exactly balanced by the downward pressure applied by the spring.

Pitch changes that decrease negative pitch angles or increase positive pitch angles will be sometimes referred to as effected "positively" or "in the positive direction." Pitch changes that decrease positive pitch angles or increase negative pitch angles will sometimes be referred to as effected "negatively" or "in the negative direction."

By centrifugal force and in the manner described, the parts are moved from the second positions shown in FIGS. 8 and 9 to the positions shown in FIGS. 10 and 11. The last said positions are sometimes hereinafter referred to as the "third positions." At the third positions, the included coning angle has been substantially increased and the links 80, 80 have additionally moved the synchronizer plate 68 in the counterclockwise direction. The described action has continued until the links 80, 80 are positioned wtih their axes in radial planes as shown in FIG. 11. The links 80, 80 when positioned as stated, tend to definitely limit any further downward movements of the blades and any further increase in the included coning angle. Said links 80, 80 and the associated parts are so constructed and connected that they act as last above stated when a predetermined speed is attained. If the connection of each link 80 to its blade were on the line B—B, any further increase in the coning angle beyond those shown in FIG. 11 would be positively prevented. But with additional increase in speed, the centrifugal action of the blades would apply increased forces tending to move the balls 54 additionally outwarly. This would effect a further positive change in pitch angles in the manner previously described. However, due to the small angles of inclination of the levers 44, 44 as shown in FIG. 10, force applied outwardly has only a relative small downward component tending to change the pitch angle. Therefore, any additional pitch angle change and any additional speed reduction would be very small unless special provisions were made for programmed governing as below described.

Figure 12:
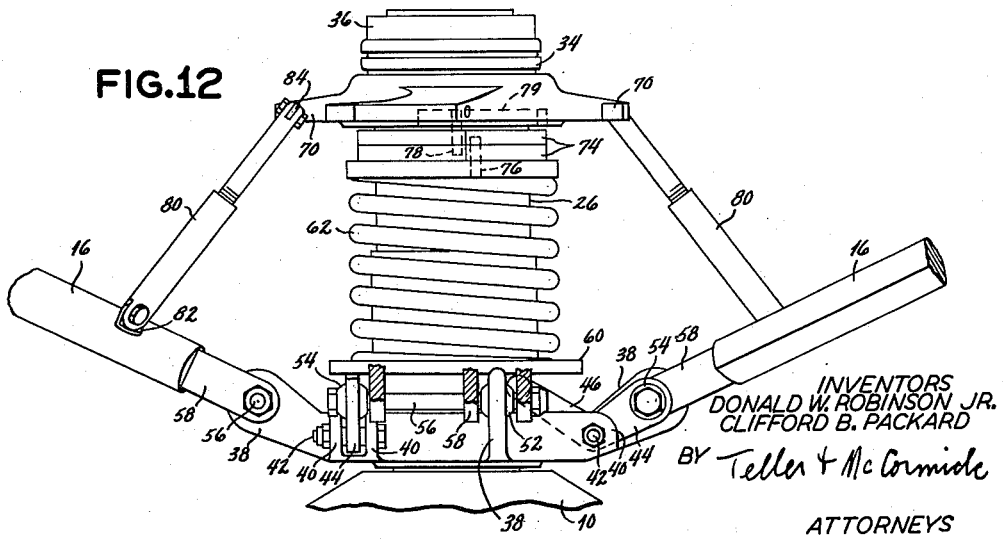
FIG. 12 is a view similar to FIG. 10, but showing the parts in slightly different relative positions.

As shown in FIGS. 1 and 11 and as previously stated, each link 80 is connected to the corresponding blade 16 at a point substantially spaced in the leading direction from the line B—B. The line B—B extends through the center of gravity of the blade and through the pivot center of the leading ball joint at 52. When the parts are in the third positions shown in FIGS. 10 and 11 and when the speed tends to increase substantially above said predetermined speed, the center of gravity of each blade on the line 86 tends to move downwardly and to increase the included coning angle of the blade. However, the blade is restrained by the link 80 and the force tending to cause downward movement at the center of gravity tends to move the ball 54 downwardly and outwardly. The last-mentioned force has a large downward component and it augments the last above-described small positive pitch changing action. The pitch angles are therefore further changed positively and the blades in positive directions move to the positions shown in FIG. 12. A condition of equilibrium would be reached wherein the forces tending to positively change the pitch angles are balanced by the action of the spring 62. The positions shown in FIG. 12 are sometimes hereinafter referred to as the "fourth positions."

The programmed governing includes the described initial action starting with the release of the aerial device from the aircraft and the withdrawal of the static block 110 and ending with the third positions shown in FIGS. 10 and 11, and this initial action takes place within a few seconds. The programmed governing further includes the terminal action which starts when the fourth position shown in FIG. 12 is reached, this terminal action being maintained as long as descent continues.

The invention claimed is:

1. In an aerial device for retarding the descent of a body, the combination of a rotor connectible with the body for rotation in a predetermined direction about a normally vertical axis which rotor includes a hub and a plurality of generally radial blades extending from the hub and equally spaced circumaxially, said rotor further including means connecting the blades with the hub for pivotal movements about transverse sweep axes tangent to a cylinder concentric with said central axis and said blades initially having first positions wherein they have a relatively small included coning angle, and wherein their sweep axes are approximately horizontal and their center lines are approximately in axial planes passing through the axis of rotation, automatically acting spring biased means for tilting said sweep axes in one direction with respect to said hub to thereby move the blades from their said first positions to second positions wherein their center lines are inclined forwardly from said axial planes and wherein the blades have equal pitch angles providing suitable angles of air attack for causing autorotation of said rotor in said predetermined direction as the device descends, a latching device initially engaging the tilting means to prevent tilting of the blades, a movable element on the aerial device separate from said latching device and connectible by a static cord with an aircraft carrying said aerial device which element is relatively movable upon the release of said aerial device from said aircraft, and means dependent upon the relative movement of said movable element for releasing said latching device to permit the spring biased means to tilt said sweep axes.

2. In an aerial device for retarding the descent of a body, the combination of a normally vertical pintle connectible with said body and having a central axis, a rotor connected with said pintle for rotation in a predetermined direction about said axis which rotor includes a hub and a plurality of generally radial blades extending from the hub and equally spaced circumaxially, said rotor further including means connecting the blades with the hub for pivotal movements about transverse sweep axes tangent to a cylinder concentric with said central axis and said blades initially having first positions wherein they have a relatively small included coning angle and wherein their sweep axes are approximately horizontal and their center lines are approximately in axial planes passing through the axis of rotation, automatically acting spring biased means for tilting said sweep axes in one direction with respect to said hub to thereby move the blades from their said first positions to second positions wherein their center lines are inclined forwardly from said axial planes and wherein the blades have equal pitch angles providing suitable angles of air attack for causing autorotation of said rotor in said predetermined direction as the device descends, a latching device carried by said pintle and initially engaging the rotor hub to prevent relative rotation of the rotor and also engaging the tilting means to prevent tilting of the sweep axes of the blades, and means for releasing said latching device to disengage it from the rotor hub and from said tilting means to permit relative rotor rotation and to permit tilting of said sweep axes.

3. In an aerial device for retarding the descent of a body, the combination of a rotor connectible with the body for rotation in a predetermined direction about a normally vertical axis which rotor includes a hub fixed against vertical movement with respect to the body and which rotor also includes a plurality of generally radial blades equally spaced circumaxially and connected with the hub for pivotal movements about transverse sweep axes tangent to a cylinder concentric with said central axis, said blades initially having first positions wherein they have a relatively small included coning angle and said blades being movable about said sweep axes to second positions wherein they have a much larger included coning angle, a coning means including a plate connected with the hub for normal rotative movement in unison therewith which plate is initially in an inactive position and is spring biased independently of the blades for relative movement out of said inactive position, said coning means also including elements directly engaging said blades and serving upon relative movement of said plate out of its said inactive position for pivotally moving said blades downwardly and outwardly about said sweep axes from said first positions to said second positions, a latching device initially engaging said plate to retain it in its said inactive position, and means for releasing said latching device to enable said coning means to move the blades downwardly and outwardly as therein before stated.

4. An aerial device as set forth in claim 3, wherein the means for releasing the latching device is constructed and arranged to contain an explosive cartridge and to be responsive to the action thereof, and wherein means is provided for igniting an explosive cartridge at said releasing means which igniting means is effective upon the release of the aerial device from an aircraft which has carried it.

5. In an aerial device for retarding the descent of a body, the combination of a rotor connectible with the body for rotation in a predetermined direction about a normally vertical axis which rotor includes a hub and a plurality of generally radial blades equally spaced circumaxially and connected with the hub for pivotal movements about transverse sweep axes tangent to a cylinder concentric with said central axis, said blades initially having first positions wherein they have a relatively small included coning angle and said blades being movable about said sweep axes to second positions wherein they have a much larger included coning angle, a synchronizer plate located in a predetermined inactive position above the hub and normally rotatable in unison therewith which plate is also rotatable relatively to the hub and out of its said inactive position, a spring for biasing the plate for relative rotation out of its said inactive position in a predetermined direction, a latching device initially engaging the synchronizer plate to retain it in its said inactive position, means for releasing said latching device to enable said plate to be relatively moved by said spring in said predetermined direction, and means actuated by said plate when relatively moved in said direction for directly engaging said blades to move them downwardly and outwardly about said sweep axes.

6. In an aerial device, the combination as set forth in claim 5, wherein said means actuated by the synchronizer plate for engaging and moving the blades comprises a plurality of arms fixedly connected to the plate and directly engaging the respective blades to move the blades outwardly when the plate is rotated.

7. In an aerial device, the combination as set forth in claim 5, wherein said means actuated by the synchronizer plate for engaging and moving the blades comprises a plurality of links pivotally connected at their upper ends to said plate and pivotally connected at their lower ends to the respective blades which links serve to move the blades outwardly when the plate is rotated.

8. In an aerial device for retarding the descent of a body, the combination of a normally vertical pintle connectible with said body and having a central axis, a sleeve connected with said pintle for rotation in a predetermined direction about said axis, a rotor including a hub fixedly connected with said sleeve and including a plurality of generally radial blades equally spaced circumaxially and connected with the hub for pivotal movements about transverse sweep axes tangent to a cylinder concentric with said central axis, said blades initially having first positions wherein they have a relatively small included coning angle and said blades being movable about said sweep axes to second positions wherein they have a much larger included coning angle, spring biased coning means directly engaging said blades for pivotally moving them downwardly and outwardly about said sweep axes from said first positions to said second positions, a locking device carried by said pintle and initially engaging said sleeve to prevent relative rotation of the rotor and initially engaging the coning means to prevent operation thereof, and means for releasing said locking device to disengage it from the sleeve to permit rotor rotation and to disengage it from the coning means to permit downward and outward coning movements of the blades.

9. In an aerial device for retarding the descent of a body, the combination of a normally vertical pintle connectible with said body and having a central axis, a rotor connected with said pintle for rotation in a predetermined direction about said axis which rotor includes a hub and a plurality of generally radial blades extending from the hub and equally spaced circumaxially, said rotor further including means connecting the blades with the hub for pivotal movements about transverse sweep axes tangent to a cylinder concentric with said central axis and said blades initially having first positions wherein they have a relatively small included coning angle and wherein their sweep axes are approximately horizontal and their center lines are approximately in axial planes passing through the axis of rotation, automatically acting spring biased means for tilting said sweep axes in one direction with respect to said hub to thereby move the blades from their said first positions, a spring biased coning means directly engaging said blades for pivotally moving them downwardly and outwardly about said sweep axes from said first positions said axis tilting means and said coning means cooperating to move the blades from their said first positions to second positions wherein the blades have a much larger included coning angle and wherein the center lines of the blades are inclined forwardly from said axial planes and wherein the blades have equal pitch angles providing suitable angles of air attack for causing autorotation of said rotor in said predetermined direction as the device descends, latching means carried by said pintle and initially engaging the rotor hub to prevent relative rotation of the rotor and also engaging the tilting means to prevent tilting of the sweep axes of the blades and further engaging the coning means to prevent said coning action, and means for releasing said latching means to disengage it from the rotor hub and from said tilting means and from said coning means to permit rotor rotation and to permit tilting of said sweep axes and to permit coning movement of the blades.

10. An aerial device as set forth in claim 9, wherein the latching means comprises two separate latching devices serving respectively to prevent operation of said axis tilting means and to prevent operation of said coning means, and wherein said releasing means is constructed and arranged to simultaneously release the two said latching means.

11. An aerial device as set forth in claim 10, wherein the releasing means comprises two separate releasing devices associated respectively with the two latching devices and each is constructed and arranged to contain an explosive cartridge and to be responsive to the action thereof, and wherein means is provided for simultaneously igniting the explosive cartridges at the two releasing devices.

12. In an aerial device for retarding the descent of a body, the combination with said body of a rotor connected therewith and rotatable about a central normally vertical axis and in a predetermined direction which rotor includes a hub and also includes a plurality of generally radial blades equally spaced circumaxially, said rotor further including means connecting the blades with the hub for pivotal movements about transverse sweep axes tangent to a cylinder concentric with said central axis, said sweep axes being so located that the blades have second positions wherein they have a substantial coning angle and have equal pitch angles providing suitable angles of air attack for causing autorotation of said rotor in said predetermined direction as the device descends, said blades upon an increase in the speed of rotation being automatically movable from said second positions to third positions wherein they have a substantially larger included coning angle, means on said rotor automatically dependent upon increases in the centrifugal action of said blades resulting from said increase in the speed of autorotation for relatively tilting said sweep axes in the direction to positively change the pitch angles of the blades as they move from said second positions to said third positions, and means directly engaging the blades at positions remote from said sweep axes for preventing any substantial additional increase in the coning angle of the blades as the result of additionally increased speed of rotation, the last said means engaging the blades at such positions that centrifugal action resulting from said additionally increased speed of rotation serves to additionally tilt said sweep axes in the positive directions and to thus move the blades from said third positions to fourth positions.

13. In an aerial device for retarding the descent of a body, the combination with said body of a rotor connected therewith and rotatable about a central normally vertical axis and in a predetermined direction which rotor includes a hub and also includes a plurality of genenerally radial blades equally spaced circumaxially, said rotor including pairs of transversely spaced blade supports on said hub for the respective blades and also including pivot pins for said blades carried respectively by said pairs of supports and providing blade sweep axes tangent to a cylinder concentric with said central axis which pivot pins are so located that the said blades have equal pitch angles providing suitable angles of air attack for causing autorotation of said rotor in said predetermined direction as the device descends, the trailing support of each said pair being relatively movable pivotally outwardly and downwardly and the leading support of each said pair being constructed to provide a pivot point about which the corresponding pivot pin is movable and said trailing supports of the several pairs being movable by the centrifugal action of the blades as the rotative speed increases so that said trailing supports are moved downwardly to tilt said pivot pins in the direction to positively change the pitch angles of the blades, and means directly engaging the blades at positions remote from said sweep axes for preventing any substantial additional increase in the coning angle of the blades as the result of additionally increased speed of rotation, the last said means engaging the blades at such positions that centrifugal action resulting from said additionally increased speed of rotation serves to additionally tilt said sweep axes in the positive directions.

14. An aerial device as set forth in claim 13, wherein the last said means includes a synchronizer plate above the hub and rotatable about the central axis and also includes a plurality of links pivotally connected at their upper ends to said plate and pivotally connected at their lower ends to the respective blades, said links being connected with the blades at positions spaced in the leading direction from a line through the center of gravity of the blade and said pivot point whereby after downward coning movement of the blades to the extent permitted by the links any additional increase in rotative speed causes the centers of gravity to move additionally downwardly, with resultant additional downward movement of the trailing supports and additional tilting of the sweep axes in the last said direction.

References Cited in the file of this patent

UNITED STATES PATENTS

| | | |
|---|---|---|
| 2,094,955 | Methvin | Oct. 5, 1937 |
| 2,509,481 | Crise | May 30, 1950 |
| 2,686,025 | Klas | Aug. 10, 1954 |
| 2,815,008 | Hirt | Dec. 3, 1957 |